US012673723B2

(12) United States Patent
  Liu et al.

(10) Patent No.: US 12,673,723 B2
(45) Date of Patent: Jul. 7, 2026

(54) STEERING WHEEL FEEL COMPENSATION METHOD

(71) Applicant: BYD COMPANY LIMITED, Shenzhen (CN)

(72) Inventors: Peng Liu, Shenzhen (CN); Wenxiu Tao, Shenzhen (CN); Yunchun Tong, Shenzhen (CN); Xin Wang, Shenzhen (CN); Yinsheng Liao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 155 days.

(21) Appl. No.: 18/516,652

(22) Filed: Nov. 21, 2023

(65) Prior Publication Data

US 2024/0083499 A1      Mar. 14, 2024

Related U.S. Application Data

(63) Continuation of application No. PCT/CN2022/121344, filed on Sep. 26, 2022.

(30) Foreign Application Priority Data

Sep. 27, 2021    (CN) ........................... 202111133360.5

(51) Int. Cl.
  *B62D 6/00*      (2006.01)
  *B62D 5/04*      (2006.01)
(52) U.S. Cl.
  CPC .......... B62D 6/008 (2013.01); B62D 5/0463 (2013.01)
(58) Field of Classification Search
  CPC ............. B62D 5/04; B62D 5/06; B62D 6/008
  See application file for complete search history.

(56) References Cited

U.S. PATENT DOCUMENTS

2004/0238238 A1* 12/2004 Yokote .................. B62D 6/008
                                                  180/6.2

FOREIGN PATENT DOCUMENTS

CN        101734135 A      6/2010
CN        101934815 A      1/2011
          (Continued)

OTHER PUBLICATIONS

Oza, D. Khatawate, VH, Lewis, GM. Pandit, GH. Patel, K. Phadke, AR. Balikai, V. "Analysis of Steering System in FSAE Vehicle." Nov. 24, 2023. Nano World Journal. vol. 9(4). p. S130. (Year: 2023).*

(Continued)

*Primary Examiner* — Logan M Kraft
*Assistant Examiner* — Joshua Campbell
(74) *Attorney, Agent, or Firm* — Sheppard Mullin Richter & Hampton LLP

(57)          ABSTRACT

A method for compensating steering wheel feel, is applied to a vehicle. The vehicle includes a first motor, a second motor, and a third motor. The first motor is configured to drive a left front wheel of the vehicle, the second motor is configured to drive a right front wheel of the vehicle, and the third motor is configured to drive a steering gear. The method includes: obtaining a traveling status and a steering status of the vehicle, and determining a compensation manner of the third motor; obtaining a driving torque of the first motor and a driving torque of the second motor, and determining a compensation torque for the third motor; and applying the compensation torque for the third motor to the third motor based on the compensation manner.

15 Claims, 1 Drawing Sheet

(56)                          References Cited

FOREIGN PATENT DOCUMENTS

| CN | 109664938 | A |   | 4/2019 | | |
|----|-----------|---|---|--------|---|---|
| CN | 110077459 | A |   | 8/2019 | | |
| CN | 112896295 | A |   | 6/2021 | | |
| CN | 115871774 | A |   | 3/2023 | | |
| JP | 2004009843 | A | * | 1/2004 | ............ | B60K 17/30 |
| JP | 2004345592 | A |   | 12/2004 | | |
| JP | 2017043290 | A |   | 3/2017 | | |
| JP | 2017177854 | A | * | 10/2017 | | |
| KR | 20130066116 | A |   | 6/2013 | | |

OTHER PUBLICATIONS

International Search Report and Written Opinion for Application
No. PCT/CN2022/121344, mailed on Nov. 29, 2022, 11 pages.

* cited by examiner

STEERING WHEEL FEEL COMPENSATION METHOD

CROSS-REFERENCE TO RELATED APPLICATIONS

This application is a Continuation application of International Patent Application No. PCT/CN2022/121344, filed on Sep. 26, 2022, which is based on and claims priority to and benefits of Chinese Patent Application No. 202111133360.5, filed on Sep. 27, 2021. The entire content of all of the above applications is incorporated herein by reference.

FIELD

The present disclosure relates to a steering wheel feel compensation method.

BACKGROUND

In the related art, to improve the power of a vehicle, multiple motors are arranged to independently control wheels. This independent control makes it easier to control a yaw torque and a longitudinal torque, thereby improving operation stability and traveling safety of the whole vehicle.

However, when the vehicle is in a steering condition, due to different driving forces for driving a left wheel and a right wheel, a force on a steering gear is unbalanced. Consequently, a steering wheel is subject to an additional rotation torque due to the different driving forces of the left wheel and the right wheel, which causes deviation or dragging of the steering wheel, affecting a steering feel.

SUMMARY

A technical problem to be resolved in the present disclosure is that, in the related art, when a vehicle is in a steering condition, different driving forces of a left wheel and a right wheel cause deviation or dragging of a steering wheel, which affects a steering feel.

To resolve the foregoing technical problem, a first aspect of the present disclosure provides a method for compensating steering wheel feel, which is applied to a vehicle. The vehicle includes a first motor, a second motor, and a third motor. The first motor is configured to drive a left front wheel of the vehicle, the second motor is configured to drive a right front wheel of the vehicle, and the third motor is configured to drive a steering gear. The method includes: obtaining a traveling status and a steering status of the vehicle, and determining a compensation manner of the third motor; obtaining a driving torque of the first motor and a driving torque of the second motor, and determining a compensation torque for the third motor; and applying the compensation torque for the third motor to the third motor based on the compensation manner.

According to the steering wheel feel compensation method provided in the present disclosure, when a vehicle is steered, a compensation torque for a third motor can be determined based on a driving torque of a first motor and a driving torque of a second motor of the vehicle, a compensation manner of the third motor is determined based on a traveling status and a steering status of the vehicle, the third motor is controlled based on the compensation manner and the compensation torque, and compensation is performed based on an original output torque of the third motor, so that a steering wheel rotation torque caused by different left and right driving torques is compensated by the third motor, thereby avoiding deviation and dragging of a steering wheel caused by the steering wheel rotation torque, and ensuring a steering feel.

In an embodiment, the traveling status includes a forward state and a reversing state, and the steering status includes a left steering state and a right steering state.

In an embodiment, the determining a compensation manner of the third motor includes:

in response to that the vehicle is in the forward state and the left steering state, reducing a left steering torque of the third motor.

In an embodiment, the determining a compensation manner of the third motor includes:

in response to that the vehicle is in the forward state and the right steering state, reducing a right steering torque of the third motor.

In an embodiment, the determining a compensation manner of the third motor includes:

in response to that the vehicle is in the reversing state and the left steering state, increasing a left steering torque of the third motor.

In an embodiment, the determining a compensation manner of the third motor includes:

in response to that the vehicle is in the reversing state and the right steering state, increasing a right steering torque of the third motor.

In an embodiment, the obtaining a driving torque of the first motor and a driving torque of the second motor, and determining a compensation torque for the third motor includes:

determining a force torque of a steering wheel based on the driving torque of the first motor and the driving torque of the second motor, where the compensation torque for the third motor is equal to the force torque of the steering wheel.

In an embodiment, the determining a force torque of a steering wheel based on the driving torque of the first motor and the driving torque of the second motor includes:

determining a resultant rotational torque of a kingpin based on the driving torque of the first motor and the driving torque of the second motor;

determining a force received by a steering tie rod based on the resultant rotational torque; and determining the force torque of the steering wheel based on the force received by the steering tie rod.

In an embodiment, the determining a resultant rotational torque of a kingpin based on the driving torque of the first motor and the driving torque of the second motor includes:

determining a driving force of the first motor and a driving force of the second motor based on the driving torque of the first motor and the driving torque of the second motor, according to:

$$F_{f1} = \frac{T_1}{d_1},$$

where $F_{f1}$ is the driving force of the first motor, $T_1$ is the driving torque of the first motor, and $d_1$ is a tire radius of the left front wheel; and $$F_{f2} = \frac{T_2}{d_2},$$

where $F_{f2}$ is the driving force of the second motor, $T_2$ is the driving torque of the second motor, and $d_2$ is a tire radius of the right front wheel; and determining the resultant rotational torque of the kingpin based on the driving force of the first motor and the driving force of the second motor, according to $T_f = (F_{f2}-F_{f1})*e$, where $T_f$ is the resultant rotational torque of the kingpin, and e is a kingpin inclination center offset.

In an embodiment, the force received by the steering tie rod based on the resultant rotational torque is determined according to: $F_s=T_f/H$, where $F_s$ is the force received by the steering tie rod, and H is a distance from an inner point of the steering tie rod to a wheel center; and the force torque of the steering wheel based on the force received by the steering tie rod is determined according to: $T_S=F_S*a/(2*\pi*1000)$, where $T_S$ is the force torque of the steering wheel, and a is a line angle transmission ratio of a steering system.

A second aspect of the present disclosure provides a non-transitory computer readable medium storing computer executable programs, where the computer executable programs are executed to cause a processor to implement the method disclosed in the first aspect.

A third aspect of the present disclosure provides a vehicle, which includes a processor and computer executable programs, wherein the computer executable programs are executed to cause the processor to implement the method disclosed in the first aspect.

Figure 1:
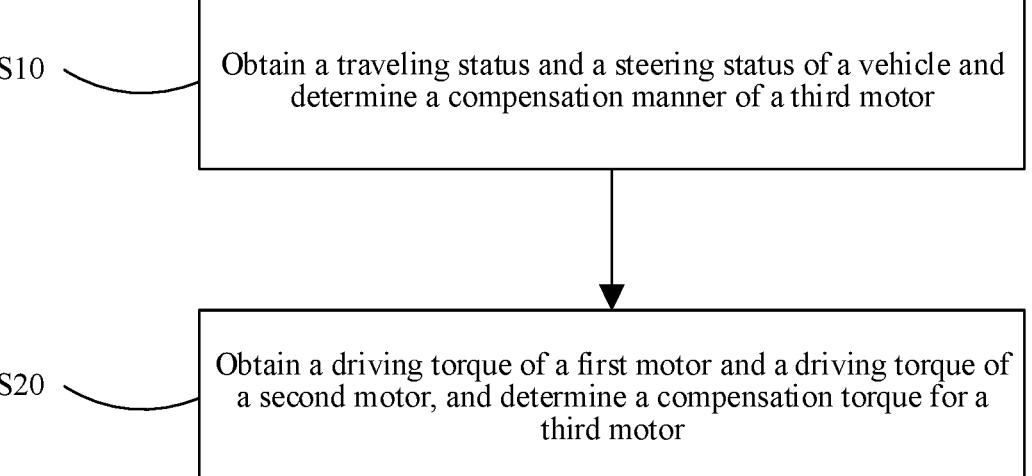
FIG. 1 is a schematic flowchart of a steering wheel feel compensation method according to an embodiment of the present disclosure.

List of reference numerals in this specification is as follows:

10: Tire, 20: Steering tie rod, 30: Rack, A: Kingpin point, B: Outer point of steering tie rod, and C: Inner point of steering tie rod.

DETAILED DESCRIPTION

To make the technical problem to be resolved by the present disclosure, technical solutions, and beneficial effects clearer, the following further describes the present disclosure in detail with reference to the embodiments. It should be understood that, the embodiments described therein are merely used for explaining the present disclosure instead of limiting the present disclosure.

An embodiment of the present disclosure provides a steering wheel feel compensation method or a method for compensating steering wheel feel, applied to a vehicle (e.g., a multi-motor-driven vehicle). The method includes the following steps.

S10: A traveling status and a steering status of a vehicle are obtained, and a compensation manner of a third motor is determined.

S20: A driving torque of a first motor and a driving torque of a second motor are obtained, and a compensation torque for a third motor is determined. The compensation torque for the third motor is applied to the third motor based on the compensation manner.

The multi-motor-driven vehicle includes a first motor, a second motor, and a third motor. The first motor is configured to drive a left front wheel of the vehicle, the second motor is configured to drive a right front wheel of the vehicle, and the third motor is configured to drive a steering gear.

According to the steering wheel feel compensation method provided in the present disclosure, when a vehicle is steered, a compensation torque for a third motor can be determined based on a driving torque of a first motor and a driving torque of a second motor of the vehicle, a compensation manner of the third motor is determined based on a traveling status and a steering status of the vehicle, the third motor is controlled based on the compensation manner and the compensation torque, and compensation is performed based on an original output torque of the third motor, so that a steering wheel rotation torque caused by different left and right driving torques is compensated by the third motor, thereby avoiding deviation and dragging of a steering wheel caused by the steering wheel rotation torque, and ensuring a steering feel.

In another embodiment, the steering wheel feel compensation method of the present disclosure may alternatively include the following content.

First, a driving torque of a first motor and a driving torque of a second motor are obtained, and a compensation torque for a third motor is determined.

Then, a traveling status and a steering status of a vehicle are obtained and a compensation manner of the third motor is determined.

That is, the compensation torque for the third motor and the compensation manner of the third motor are not determined in order. Provided that the third motor is controlled by using the determined compensation manner and compensation torque for the third motor.

In an embodiment, in S10, the traveling status of the vehicle includes a forward state and a reversing state, and the steering status includes a left steering state and a right steering state. Then, the traveling status and the steering status of the vehicle are combined, to obtain four different states, which are respectively a forward left steering state, a forward right steering state, a reversing left steering state, and a reversing right steering state.

In an embodiment, when the vehicle is in the forward state and the left steering state, that is, when the vehicle is in the forward left steering state, the third motor performs compensation by reducing a left steering torque, that is, the third motor reduces the left steering torque based on a left assisting torque. A proportion by which the left steering torque is reduced is a force torque of a steering wheel caused by different driving forces of a left wheel and a right wheel.

When the vehicle is in the forward state and the right steering state, that is, when the vehicle is in the forward right steering state, the third motor performs compensation by reducing a right steering torque. That is, the third motor reduces the right steering torque based on a right assisting torque. A proportion by which the right steering torque is reduced is a force torque of the steering wheel caused by different driving forces of the left wheel and the right wheel.

When the vehicle is in the reversing state and the left steering state, that is, when the vehicle is in the reversing left steering state, the third motor performs compensation by increasing the left steering torque. That is, the third motor increases the left steering torque based on the left assisting torque. A proportion by which the left steering torque is increased is a force torque of the steering wheel caused by different driving forces of the left wheel and the right wheel.

When the vehicle is in the reversing state and the right steering state, that is, when the vehicle is in the reversing right steering state, the third motor performs compensation by increasing the right steering torque. That is, the third motor increases the right steering torque based on the right assisting torque. A proportion by which the right steering torque is increased is a force torque of the steering wheel caused by different driving forces of the left wheel and the right wheel.

When the vehicle turns left in the forward state, the steering wheel is rotated counterclockwise, the right wheel is an outer wheel, a driving force of the right wheel is greater than a driving force of the left wheel, and a driving torque of the right wheel is greater than a driving torque of the left wheel. Therefore, a direction of a steering wheel caused by different driving forces of the left wheel and the right wheel is consistent with a direction of the driving torque of the right wheel. A kingpin point of the right wheel is on an inner side of the wheel, the right wheel is driven to rotate counterclockwise, that is, the direction of the driving torque of the right wheel is counterclockwise, and the direction of the steering wheel torque caused by different driving forces of the left wheel and the right wheel is also counterclockwise. Therefore, before compensation is performed, a torque received by the steering wheel includes a counterclockwise assisting torque required for steering and a counterclockwise force torque due to different driving forces of the left wheel and right wheel, that is, the torque generated due to different driving forces of the left wheel and the right wheel increases the assisting torque of the steering wheel, resulting deviation of the steering wheel. Therefore, it is necessary to reduce the left steering torque to eliminate an interference caused by different driving of the left wheel and the right wheel, avoid deviation of the steering wheel, improve vehicle stability, and ensure the steering feel. In this case, a torque outputted by the third motor is the assisting torque minus the force torque.

When the vehicle turns right in the forward state, in this case, the steering wheel is rotated clockwise, the left wheel is an outer wheel, a driving force of the left wheel is greater than a driving force of the right wheel, and a driving torque of the left wheel is greater than a driving torque of the right wheel. Therefore, a direction of a steering wheel torque caused by different driving forces of the left wheel and the right wheel is consistent with a direction of the driving torque of the left wheel. A kingpin point of the left wheel is on an inner side of the wheel, the left wheel is driven to rotate clockwise, that is, the direction of the driving torque of the left wheel is clockwise, and the direction of the steering wheel torque caused by different driving forces of the left wheel and the right wheel is also clockwise. Therefore, before compensation is performed, a torque on the steering wheel includes a clockwise assisting torque required for steering and a clockwise force torque due to the different driving forces of the left wheel and right wheel, that is, the torque generated due to the different driving forces of the left wheel and the right wheel increases the assisting torque of the steering wheel. In this way, a phenomenon that the steering wheel grabs the direction occurs. Therefore, it is necessary to reduce the right steering torque to eliminate an interference caused by the torque generated by the different driving forces of the left wheel and the right wheel, avoid the phenomenon that the steering wheel grabs the direction, improve vehicle stability, and ensure the steering feel. In this case, a torque outputted by the third motor is the assisting torque minus the force torque.

When the vehicle turns left in the reversing state, in this case, the steering wheel rotates counterclockwise, the driving force of the right wheel is greater than the driving force of the left wheel, and the driving torque of the right wheel is greater than the driving torque of the left wheel. Therefore, a direction of the steering wheel torque caused by the different driving forces of the left wheel and the right wheel is consistent with a direction of the driving torque of the right wheel. A kingpin point of the right wheel is an inner side of the wheel, the right wheel is driven to rotate clockwise, that is, the direction of the driving torque of the right wheel is clockwise, and the direction of the steering wheel torque caused by the different driving forces of the left wheel and the right wheel is also clockwise. Therefore, before compensation is performed, a torque received by the steering wheel includes a counterclockwise rotation torque required for steering and a clockwise force torque due to different driving forces of the left wheel and right wheel, that is, the torque generated due to different driving forces of the left wheel and the right wheel reduces the assisting torque of the steering wheel, resulting in dragging of the steering wheel. Therefore, it is necessary to increase the left steering torque to eliminate an interference caused by different driving of the left wheel and the right wheel, avoid dragging of the steering wheel, and ensure the steering feel. In this case, a torque outputted by the third motor is the assisting torque plus the force torque.

When the vehicle turns right in the reversing state, in this case, the steering wheel is rotated clockwise, a driving force of the left wheel is greater than a driving force of the right wheel, and a driving torque of the left wheel is greater than a driving torque of the right wheel. Therefore, a direction of a steering wheel torque caused by different driving forces of the left wheel and the right wheel is consistent with a direction of the driving torque of the left wheel. A kingpin point of the left wheel is on an inner side of the wheel, the left wheel is driven to rotate counterclockwise, that is, the direction of the driving torque of the left wheel is counterclockwise, and the direction of the steering wheel torque caused by different driving forces of the left wheel and the right wheel is also counterclockwise. Therefore, before compensation is performed, a torque received by the steering wheel includes a clockwise assisting torque required for steering and a counterclockwise force torque due to different driving forces of the left wheel and right wheel, that is, the torque generated due to different driving forces of the left wheel and the right wheel reduces the assisting torque of the steering wheel, resulting in dragging of the steering wheel. Therefore, it is necessary to increase the right steering torque to eliminate an interference caused by different driving forces of the left wheel and the right wheel, avoid dragging of the steering wheel, and ensure the steering feel. In this case, a torque outputted by the third motor is the assisting torque plus the force torque.

In S20, that the driving torque of the first motor and the driving torque of the second motor are obtained and the compensation torque for the third motor is determined includes:

determining a force torque of a steering wheel based on the driving torque of the first motor the driving torque of the second motor, where the compensation torque for the third motor is equal to the force torque of the steering wheel.

The determining a force torque of a steering wheel based on the driving torque of the first motor and the driving torque of the second motor includes:

determining a resultant rotational torque of a kingpin based on the driving torque of the first motor and the driving torque of the second motor;

determining a force received by a steering tie rod based on the resultant rotational torque; and determining the force torque of the steering wheel based on the force received by the steering tie rod.

In an embodiment, the determining a resultant rotational torque of a kingpin based on the driving torque of the first motor and the driving torque of the second motor includes:

determining a driving force of the first motor and a driving force of the second motor based on the driving torque of the first motor and the driving torque of the second motor, according to:

$$F_{f1} = \frac{T_1}{d_1},$$

where $F_{f1}$ is the driving force of the first motor, $T_1$ is the driving torque of the first motor, and $d_1$ is a tire radius of the left front wheel; and $$F_{f2} = \frac{T_2}{d_2},$$

where $F_{f2}$ is the driving force of the second motor, $T_2$ is the driving torque of the second motor, and $d_2$ is a tire radius of the right front wheel; and determining the resultant rotational torque of the kingpin based on the driving force of the first motor and the driving force of the second motor, according to $T_f=(F_{f2}-F_{f1})*e$, where $T_f$ is the resultant rotational torque of the kingpin, and e is a kingpin inclination center offset.

The force received by a steering tie rod based on the resultant rotational torque is determined by:

$F_s=T_f/H$, where $F_s$ is the force received by the steering tie rod, and H is a distance from an inner point of the steering tie rod to a wheel center; and the force torque of the steering wheel based on the force received by the steering tie rod is determined by:

$T_S=F_S*a/(2*\pi*1000)$, where $T_S$ is the force torque of the steering wheel, and a is a line angle transmission ratio of a steering system.

Figure 2:
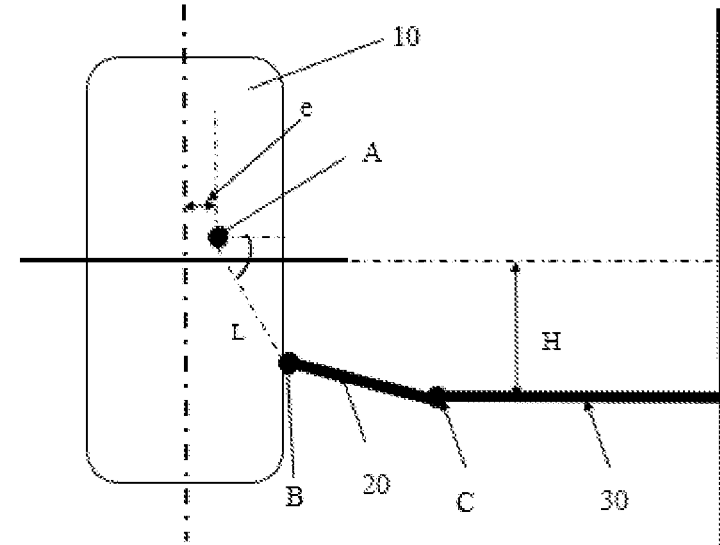
FIG. 2 is a partial schematic diagram of a vehicle to which a steering wheel feel compensation method is applied according to an embodiment of the present disclosure.

As shown in FIG. 2, the steering gear includes a steering tie rod 20 and a rack 30. The rack 30 is connected to the third motor, the steering tie rod 20 is connected to the rack, the steering tie rod 20 is connected to a corresponding wheel shock absorber through an outer point of the steering tie rod. The kingpin inclination center offset e is a distance from a kingpin point A to a center plane of a tire 10, and H is a distance from an inner point C of the steering tie rod to a wheel center.

In an embodiment, a vehicle is provided, which includes a processor and computer executable programs. The computer executable programs are executed to cause the processor to implement the method for compensating steering wheel feel disclosed above, The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for compensating steering wheel feel, applied to a vehicle, wherein the vehicle comprises a first motor, a second motor, and a third motor, the first motor is configured to drive a left front wheel of the vehicle, the second motor is configured to drive a right front wheel of the vehicle, the third motor is configured to drive a steering gear, and the method comprising:

obtaining a traveling status and a steering status of the vehicle, and determining a compensation manner of the third motor;

obtaining a driving torque of the first motor and a driving torque of the second motor, and determining a compensation torque for the third motor; and applying the compensation torque for the third motor to the third motor based on the compensation manner, wherein the obtaining a driving torque of the first motor and a driving torque of the second motor, and determining a compensation torque for the third motor comprises:

determining a resultant rotational torque of a kingpin based on the driving torque of the first motor and the driving torque of the second motor;

determining a force received by a steering tie rod based on the resultant rotational torque; and determining a force torque of a steering wheel based on the force received by the steering tie rod, wherein the compensation torque for the third motor is equal to the force torque of the steering wheel, and wherein:

the force received by the steering tie rod based on the resultant rotational torque is determined according to: $F_S=T_f/H$, where $F_S$ is the force received by the steering tie rod, $T_f$ is the resultant rotational torque of the kingpin, and H is a distance from an inner point of the steering tie rod to a wheel center; and the force torque of the steering wheel based on the force received by the steering tie rod is determined according to: $T_S=F_S*a/(2*\pi*1000)$, where $T_S$ is the force torque of the steering wheel, and a is a line angle transmission ratio of a steering system.

2. The method according to claim 1, wherein the traveling status comprises a forward state and a reversing state, and the steering status comprises a left steering state and a right steering state.

3. The method according to claim 2, wherein the determining a compensation manner of the third motor comprises:

in response to that the vehicle is in the forward state and the left steering state, reducing a left steering torque of the third motor.

4. The method according to claim 2, wherein the determining a compensation manner of the third motor comprises:

in response to that the vehicle is in the forward state and the right steering state, reducing a right steering torque of the third motor.

5. The method according to claim 2, wherein the determining a compensation manner of the third motor comprises:

in response to that the vehicle is in the reversing state and the left steering state, increasing a left steering torque of the third motor.

6. The method according to claim 2, wherein the determining a compensation manner of the third motor comprises:

in response to that the vehicle is in the reversing state and the right steering state, increasing a right steering torque of the third motor.

7. The method according to claim 1, wherein the determining a resultant rotational torque of a kingpin based on the driving torque of the first motor and the driving torque of the second motor comprises:

determining a driving force of the first motor and a driving force of the second motor based on the driving torque of the first motor and the driving torque of the second motor according to:

$$F_{f1} = \frac{T_1}{d_1},$$

where $F_{f1}$ is the driving force of the first motor, $T_1$ is the driving torque of the first motor, and $d_1$ is a tire radius of the left front wheel; and $$F_{f2} = \frac{T_2}{d_2},$$

where $F_{f2}$ is the driving force of the second motor, $T_2$ is the driving torque of the second motor, and $d_2$ is a tire radius of the right front wheel; and determining the resultant rotational torque of the kingpin based on the driving force of the first motor and the driving force of the second motor according to $T_f=(F_{f2}-F_{f1})*e$, where $T_f$ is the resultant rotational torque of the kingpin, and e is a kingpin inclination center offset.

8. A non-transitory computer readable medium, storing computer executable programs, wherein the computer executable programs are executable to cause a processor to perform operations applied to a vehicle, wherein the vehicle comprises a first motor, a second motor, and a third motor, the first motor is configured to drive a left front wheel of the vehicle, the second motor is configured to drive a right front wheel of the vehicle, the third motor is configured to drive a steering gear, wherein the operations comprise:

obtaining a traveling status and a steering status of the vehicle, and determining a compensation manner of the third motor;

obtaining a driving torque of the first motor and a driving torque of the second motor, and determining a compensation torque for the third motor; and applying the compensation torque for the third motor to the third motor based on the compensation manner, wherein the obtaining a driving torque of the first motor and a driving torque of the second motor, and determining a compensation torque for the third motor comprises:

determining a resultant rotational torque of a kingpin based on the driving torque of the first motor and the driving torque of the second motor;

determining a force received by a steering tie rod based on the resultant rotational torque; and determining a force torque of a steering wheel based on the force received by the steering tie rod, wherein the compensation torque for the third motor is equal to the force torque of the steering wheel, and wherein:

the force received by the steering tie rod based on the resultant rotational torque is determined according to: $F_S=T_f/H$, where $F_S$ is the force received by the steering tie rod, $T_f$ is the resultant rotational torque of the kingpin, and H is a distance from an inner point of the steering tie rod to a wheel center; and the force torque of the steering wheel based on the force received by the steering tie rod is determined according to: $T_S=F_S*a/(2*\pi*1000)$, where $T_S$ is the force torque of the steering wheel, and a is a line angle transmission ratio of a steering system.

9. The non-transitory computer readable medium according to claim 8, wherein the traveling status comprises a forward state and a reversing state, and the steering status comprises a left steering state and a right steering state.

10. The non-transitory computer readable medium according to claim 9, wherein the determining a compensation manner of the third motor comprises:

in response to that the vehicle is in the forward state and the left steering state, reducing a left steering torque of the third motor.

11. The non-transitory computer readable medium according to claim 9, wherein the determining a compensation manner of the third motor comprises:

in response to that the vehicle is in the forward state and the right steering state, reducing a right steering torque of the third motor.

12. The non-transitory computer readable medium according to claim 9, wherein the determining a compensation manner of the third motor comprises:

in response to that the vehicle is in the reversing state and the left steering state, increasing a left steering torque of the third motor.

13. The non-transitory computer readable medium according to claim 9, wherein the determining a compensation manner of the third motor comprises:

in response to that the vehicle is in the reversing state and the right steering state, increasing a right steering torque of the third motor.

14. The non-transitory computer readable medium according to claim 8, wherein the determining a resultant rotational torque of a kingpin based on the driving torque of the first motor and the driving torque of the second motor comprises:

determining a driving force of the first motor and a driving force of the second motor based on the driving torque of the first motor and the driving torque of the second motor according to:

$$F_{f1} = \frac{T_1}{d_1},$$

where $F_{f1}$ is the driving force of the first motor, $T_1$ is the driving torque of the first motor, and $d_1$ is a tire radius of the left front wheel; and $$F_{f2} = \frac{T_2}{d_2},$$

where $F_{f2}$ is the driving force of the second motor, $T_2$ is the driving torque of the second motor, and $d_2$ is a tire radius of the right front wheel; and determining the resultant rotational torque of the kingpin based on the driving force of the first motor and the driving force of the second motor according to $T_f=(F_{f2}-F_{f1})*e$, where $T_f$ is the resultant rotational torque of the kingpin, and e is a kingpin inclination center offset.

15. A vehicle, comprising a processor and computer executable programs, wherein the computer executable programs are executable to cause the processor to perform operations, wherein the vehicle comprises a first motor, a second motor, and a third motor, the first motor is configured to drive a left front wheel of the vehicle, the second motor is configured to drive a right front wheel of the vehicle, the third motor is configured to drive a steering gear, wherein the operations comprise:

obtaining a traveling status and a steering status of the vehicle, and determining a compensation manner of the third motor;

obtaining a driving torque of the first motor and a driving torque of the second motor, and determining a compensation torque for the third motor; and applying the compensation torque for the third motor to the third motor based on the compensation manner, wherein the obtaining a driving torque of the first motor and a driving torque of the second motor, and determining a compensation torque for the third motor comprises:

determining a resultant rotational torque of a kingpin based on the driving torque of the first motor and the driving torque of the second motor;

determining a force received by a steering tie rod based on the resultant rotational torque; and determining a force torque of a steering wheel based on the force received by the steering tie rod, wherein the compensation torque for the third motor is equal to the force torque of the steering wheel, and wherein:

the force received by the steering tie rod based on the resultant rotational torque is determined according to: $F_S = T_f/H$, where $F_S$ is the force received by the steering tie rod, $T_f$ is the resultant rotational torque of the kingpin, and H is a distance from an inner point of the steering tie rod to a wheel center; and the force torque of the steering wheel based on the force received by the steering tie rod is determined according to: $T_S = F_S * a/(2 * \pi * 1000)$, where $T_S$ is the force torque of the steering wheel, and a is a line angle transmission ratio of a steering system.

\* \* \* \* \*